UNITED STATES PATENT OFFICE.

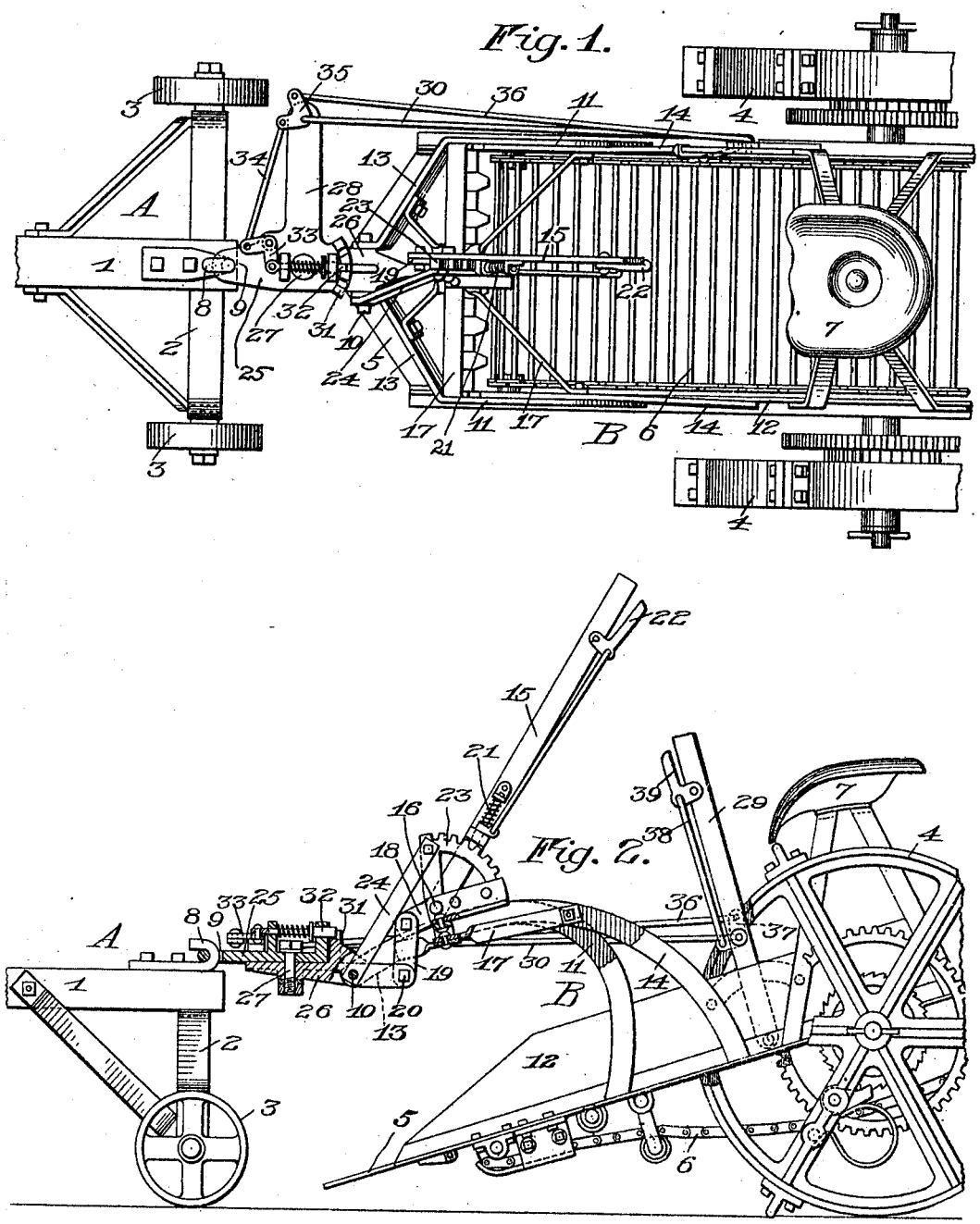

WILLIAM H. RICE, OF ROCHESTER, NEW YORK.

TOOL-CONTROLLING MECHANISM FOR AGRICULTURAL IMPLEMENTS.

945,192. Specification of Letters Patent. Patented Jan. 4, 1910.

Original application filed December 26, 1905, Serial No. 293,167. Divided and this application filed February 23, 1909. Serial No. 479,620.

*To all whom it may concern:*

Be it known that I, WILLIAM H. RICE, of Rochester, in the county of Monroe and State of New York, have invented certain new and useful Improvements in Tool-Controlling Mechanisms for Agricultural Implements; and I do hereby declare the following to be a full, clear, and exact description of the same, reference being had to the accompanying drawings, forming a part of this specification, and to the reference-numerals marked thereon.

The present invention relates to tool controlling mechanisms for agricultural implements, and this application is a division of an application filed by me on December 26, 1905, Serial No. 293,167, for improvements in potato diggers.

The invention has for an object to provide a simple and inexpensive connection between a tool carrying frame and a truck, having provisions whereby the tool carrying frame may be shifted both vertically and horizontally relatively to the truck in order to vary the depth of operation of the tool and also having provision for varing the lateral position of the tool carrying frame without changing the line of draft of the machine.

To these and other ends the invention consists in certain improvements and combinations of parts all as will be hereinafter more fully described, the novel features being pointed out in the claims at the end of the specification.

In the drawings: Figure 1 is a top view of a potato digger embodying the invention, and Fig. 2 is a side view of the same machine with parts shown in section for the purpose of affording a better illustration.

Referring more particularly to the drawings A indicates a truck which, in the present instance, embodies a draft pole 1 rigidly secured to the truck frame 2 on which the truck wheels 3 are journaled.

The tool carrying frame B which is connected to the truck frame in the manner to be hereinafter described may embody ground wheels 4 supporting the tool or excavator 5 which delivers the excavated material to an endless conveyer and separator driven from the ground wheels in any suitable manner, a seat 7 being arranged above the separator for the operator.

The connection between the truck and the tool carrying frame is preferably established by a connector which may be secured to the truck so as to swing about a vertical and a horizontal axis relatively thereto, this being, in this instance, effected by a hook 8 on the truck engaging in an eye 9 on the connector, such connection also permitting the truck to be readily detached from the other portions of the machine. The attachment to the tool carrying frame is effected in such a manner that the connector may swing relatively to said frame about a horizontal axis, and to this end the connector may be pivoted at 10 between two arms 11 that extend upwardly and forwardly from the sides 12 of the tool carrying frame and converge toward each other as at 13 at their forward ends to receive the pivot pin 10, braces 14 being provided to strengthen the structure.

From the foregoing it will be seen that the connector will permit the tool carrying frame to be raised and lowered relatively to the truck and in order to effect this result I preferably employ a lever mechanism operable from the seat 7 and comprising a lever 15 pivotally supported at 16 upon the braces that strengthen the arms 11, the lever having an extension 18 which, by a link 19, is pivotally connected to the connector at 20 in rear of its pivotal connection 10. It is apparent that when the lever 15 is swung to the rear, the rear end of the connector will be moved upwardly about the connection with the truck as a horizontal axis, thus effecting the raising of the tool or excavator 5; and that when the lever 15 is moved forwardly a reverse movement of the excavator or tool 5 is effected. Any suitable locking means may be employed for retaining the lever and consequently the tool carrying frame in their adjusted positions, but it is preferred to employ a manually operable latch 21 controlled by the hand piece 22 on the lever and coöperating with the rack 23 that is supported in proximity to the pivot 16 of said lever. A brace 24 may extend from the pivot 10 to the rack in order to brace the rack and to relieve the forward ends of the arms 11 of the weight of the tool carrying frame.

It is preferred to make the connector, hereinbefore mentioned, of two members 25 and 26 pivotally connected together at 27 in order to move relatively to each other about a vertical axis. This construction permits the tool carrying frame to shift laterally relatively to the truck so that the position of the tool with relation to the line of draft may be changed. The movement is preferably effected by a lever mechanism, and to this end the member 25 is provided with an arm 28 to the outer end of which is connected a pull rod 30 which may be operated from a lever 29 pivotally mounted on the tool carrying frame.

It is, of course, desirable to provide some means for preventing this lateral shifting of the tool carrying frame during the operation of the machine, and to this end there may be employed locking devices for retaining the members 25 and 26 in their relatively adjusted positions. The locking devices, in this instance, embodying a curved rack 31 extending upwardly from and integral with the member 26 to receive a spring pressed latch 32 slidably arranged on the member 25. This latch may be operated by being pivotally connected to one end of the bell crank lever 33 pivoted on the member 25 and connected by a pull rod 34 to the bell crank lever 35 on the outer end of the arm 28, the lever 35 being connected by the pull rod 36 to the bell crank lever 37 on the operating lever 29, and the bell crank lever 37 is, by the rod 38, connected to a manually operable lever 39 on the operating lever 29.

In the operation of the machine a forward movement of the truck will, of course, carry the tool carrying frame, the connection 8, 9, permitting the turning of the machine around corners. To vary the depth of the operation of the excavator or tool the controlling lever 15 is manipulated, the latch 21, of course, being withdrawn from the rack 23 at the beginning of the operation and thrown into engagement therewith at the end of said operation. To shift the tool carrying frame laterally to the line of draft of the truck for the purpose of operating on the side of a hill or other places where such a shifting may be necessary, the operator pulls upon the lever 39, which withdraws the latch 32 from the rack 31, when the lever 29 may be shifted to effect the relative movement between members 25 and 26 of the connector. After the proper adjustment has been secured the lever 39 is released permitting the latch 32 to reëngage the rack 31, thus effectually holding said members against relative movement during the operation of the machine.

From the foregoing it will be seen that the present invention provides a simple and inexpensive construction embodying a minimum number of parts, which may be readily detached for the purpose of repair. The tool carrying frame may be quickly shifted to any operating position and very little effort on the part of the operator is required to effect this result.

I claim as my invention:

1. The combination with a tool carrying frame and a truck, of a connector between said parts mounted to swing about a horizontal axis relatively to each of them and embodying two members mounted to swing relatively to each other about a vertical axis.

2. The combination with a tool carrying frame and a truck, of a connector between said parts mounted to swing about a horizontal axis relatively to each of them and embodying two members mounted to swing relatively to each other about a vertical axis, and means for holding said members against relative movement.

3. The combination with a tool carrying frame and a truck, of a connector between said parts mounted to swing about a horizontal axis relatively to each of them and embodying two members mounted to swing relatively to each other about a vertical axis, and a lever mechanism for relatively adjusting said members.

4. The combination with a tool carrying frame and a truck, of a connector between said parts mounted to swing about a horizontal axis relatively to each of them and embodying two members mounted to swing relatively to each other about a vertical axis, and a lever mechanism for adjusting the connector relatively to the tool carrying frame.

5. The combination with a tool carrying frame and a wheeled truck, of a member having pivotal connection with each permitting a relative movement between the member and the truck and between the member and the tool carrying frame about vertical axes, the forward axis being located substantially over the axis of turning of the wheels of the truck.

6. The combination with a tool carrying frame and a wheeled truck, of a member having pivotal connection with each permitting a relative movement between the member and the truck and between the member and the tool carrying frame about vertical axes, one axis being located substantially over the axis of turning of the wheels of the truck, and means for locking said member against a movement about the other of said vertical axes.

7. The combination with a tool carrying frame and a wheeled truck, of a member having pivotal connection with each permitting a relative movement between the member and the truck and between the member and the tool carrying frame about vertical axes, one of the axes being located substantially over the axis of turning of the wheels of the truck, and a lever mechanism for shifting said member about both of said axes.

8. The combination with a wheeled frame carrying an excavator, a conveyer receiving material therefrom, and a frame supported by the sides of the wheeled frame, of a wheeled truck having a rigidly mounted draft pole, a member connected to the truck to swing freely about a vertical axis located substantially over the axis of turning of the wheels and also connected to the frame above the main frame to swing about a vertical axis, and means for holding said member against turning about last mentioned axis.

9. The combination with a tool carrying frame and a truck, of a member having pivotal connection with each permitting a relative movement between the member and the truck and between the member and the tool carrying frame about vertical axes, a pull rod connected to said member upon one side of the vertical plane of said axes, and means for operating the pull rod.

10. The combination with a tool carrying frame and a truck, of a member having pivotal connection with each permitting a relative movement between the member and the truck and between the member and the tool carrying frame about vertical axes, said member also having a rigid arm extending laterally therefrom, and means for shifting said arm to shift the members.

11. The combination with a tool carrying frame and a truck, of a member having pivotal connection with each permitting a relative movement between the member and the truck and between the member and the tool carrying frame about vertical axes, a pull rod connected to said member, and a lever pivoted to the tool carrying frame and to the pull rod.

12. The combination with a tool carrying frame and a truck, of a member having pivotal connection with each permitting a relative movement between the member and the truck and between the member and the tool carrying frame about vertical axes, said member also having a rigid arm extending laterally therefrom, a pull rod connected to the arm, an operating lever pivoted to the tool carrying frame and connected to the pull rod, a latch for holding the member against turning about one of its vertical axes, a bell crank lever mounted near the outer end of the arm on said member and connected to the latch, a pull rod connected to the bell crank lever, a bell crank on the operating lever connected to the pull bar, and a manually operable member connected to the bell crank lever on the operating lever.

13. The combination with a tool carrying frame and a truck, of a connector between the tool carrying frame and the truck mounted to swing freely about a vertical and a horizontal axis relatively to said truck and also about a horizontal axis relatively to the tool carrying frame, said connector embodying two members adapted to move relatively to each other about a vertical axis.

14. The combination with a tool carrying frame and a truck, of a connector between the tool carrying frame and the truck mounted to swing freely about a vertical and a horizontal axis relatively to said truck and also about a horizontal axis relatively to the tool carrying frame, said connector embodying two members adapted to move relatively to each other about a vertical axis, means for locking said connector in its adjusted position relatively to the tool carrying frame, and means for locking the two members of the connector in their relatively adjusted position.

15. The combination with a tool carrying frame and a truck, of a connector between the tool carrying frame and the truck mounted to swing freely about a vertical and a horizontal axis relatively to said truck and also about a horizontal axis relatively to the tool carrying frame, said connector embodying two members adapted to move relatively to each other about a vertical axis, a lever mechanism for effecting a relative adjustment between said connector and the tool carrying frame, and a lever mechanism for effecting a relative adjustment between the two members of the connector.

16. The combination with a wheeled tool carrying frame, of a member pivotally connected therewith to turn about a vertical axis and having a rigid arm extending laterally therefrom, a lever mechanism connected to said rigid arm for shifting said member about said vertical axis, and a draft pole having connection with said member.

17. The combination with a wheeled tool carrying frame, of a member pivotally connected therewith to turn about a vertical axis, a pull bar connected to said member at one side of its vertical axis, a lever connected to the pull bar, and a draft pole having connection with said members.

WILLIAM H. RICE.

Witnesses:
 RUSSELL B. GRIFFITH,
 HAROLD H. SIMMS.